United States Patent
Chodem et al.

(10) Patent No.: US 12,366,976 B1
(45) Date of Patent: Jul. 22, 2025

(54) CONVERTING A SOLID-STATE DRIVE OPERATING IN A FIRST MODE TO ANOTHER SOLID-STATE DRIVE OPERATING IN A SECOND MODE

(71) Applicant: SanDisk Technologies LLC, Austin, TX (US)

(72) Inventors: Nagi Reddy Chodem, Bangalore (IN); Naga Shankar Vadalamani, Bangalore (IN); Navin Kochar, Bangalore (IN)

(73) Assignee: Sandisk Technologies Inc., Milpitas, CA (US)

( * ) Notice: Subject to any disclaimer, the term of this patent is extended or adjusted under 35 U.S.C. 154(b) by 0 days.

(21) Appl. No.: 18/740,086

(22) Filed: Jun. 11, 2024

(51) Int. Cl.
G06F 3/06 (2006.01)

(52) U.S. Cl.
CPC .......... G06F 3/0619 (2013.01); G06F 3/0634 (2013.01); G06F 3/0679 (2013.01)

(58) Field of Classification Search
CPC .............................. G06F 3/0619; G06F 3/0679
See application file for complete search history.

(56) References Cited

U.S. PATENT DOCUMENTS

| | | | |
|---|---|---|---|
| 8,954,694 B2 | 2/2015 | Tomlin | |
| 9,851,910 B2 | 12/2017 | Cohen | |
| 11,061,663 B2* | 7/2021 | Rosner | G06F 12/10 |
| 11,194,489 B2* | 12/2021 | Alrod | G06F 3/0604 |
| 11,461,233 B2 | 10/2022 | Lam | |
| 2018/0067800 A1* | 3/2018 | Gusev | G06F 11/1068 |
| 2019/0087174 A1* | 3/2019 | Lappi | G06F 8/654 |

* cited by examiner

Primary Examiner — Mark A Giardino, Jr.
(74) Attorney, Agent, or Firm — Arlene P. Neal; Neal Blibo LLC

(57) ABSTRACT

A storage device may maintain persistent data after converting from firmware associated with a first mode to firmware associated with a second mode. The device receives a firmware package associated with the second mode, determines when the package includes a descriptor, and executes a copy macro in the descriptor to translate a first data structure used in the first mode to the second data structure used in the second mode. When the device receives a commit command and determines that the second data structure is in a volatile memory, the device copies the second data structure to a non-volatile memory. After completing the commit command and power cycling, when the device is being formatted in the second mode, the device reads the second data structure from the non-volatile memory, transfers the second data structure to a persistence module, and formats in the second mode.

20 Claims, 9 Drawing Sheets

CONVERTING A SOLID-STATE DRIVE OPERATING IN A FIRST MODE TO ANOTHER SOLID-STATE DRIVE OPERATING IN A SECOND MODE

BACKGROUND OF THE INVENTION

A storage device may be communicatively coupled to a host and to non-volatile memory including, for example, a NAND flash memory device on which the storage device may store data received from the host. The storage device may include metadata structures to support metadata being used by the storage device. As technologies change, there may be a need to update/change the firmware that is currently being executed on the storage device while retaining the current state of the storage device hardware. When the firmware is updated/changed, the metadata structures used on the existing firmware may be different from the metadata structures associated with the updated firmware. Nevertheless, both the existing and updated firmware may use the some of the same metadata, and as such the same metadata may be stored in different/updated structures in the existing and updated firmware.

Consider an example where cloud storage customers may want to change/update a conventional namespace storage device to a zoned namespace (ZNS) storage device to reduce the total cost of ownership of storage. To facilitate this conversion without changing the storage device hardware, the customers may request that the storage device vendors use a common hardware for ZNS enabled storage devices and non-ZNS enabled storage devices. This may enable the customers to use the same storage device with a traditional block interface enabled host or a ZNS enabled host. However, the adoption of ZNS technology is in its infancy and customers may still be developing their host software stack that may be used in ZNS enabled storage devices. In other examples, there may be a need to convert a conventional storage device to an endurance group enabled device or to convert a conventional storage device to a flexible data placement (FDP) enabled device.

In converting a conventional storage device to, for example, a ZNS storage device or FDP enabled storage device, the device vendor may update the firmware on the storage device during the conversion. After the conversion, the device vendor may have to ensure that the remaining life of the storage device is maintained, the necessary metadata persists, and that the device vendor has foreseen and met all the architectural requirements associated with the conversion. In the example of converting from a conventional storage device to a ZNS storage device, a current approach may include, for example, preparing a ZNS firmware binary, downloading the ZNS firmware binary using, for example a non-volatile memory express (NVMe) command, activating the ZNS firmware with, for example, an NVMe activate command, and power cycling the storage device to boot into the ZNS firmware.

To ensure that after the conversion, the necessary metadata persists, a SCRAM method may be implemented. For example, to ensure that erase block metadata and NAND counters associated with the remaining life of the storage device and/or the bytes written and read persist, the SCRAM method may be used. The SCRAM method includes a process of writing metadata to the memory device after losing power with a capacitor backup. However, as noted, the format and/or size of the data structures storing metadata may be different in an existing firmware and updated firmware. For example, new fields might be added in an erase block metadata structure, new NAND counters may be added, or fields may be removed from a metadata structure associated with the updated firmware. Given that not all the requirements associated with an updated firmware may be known, the SCRAM manifest may need to be overprovisioned to meet future firmware requirements. Overprovisioning of the SCRAM manifest may increase the cost of the storage device. Furthermore, it may be impossible to foresee and accommodate all the requirements associated with an unknown architecture design of a future firmware.

SUMMARY OF THE INVENTION

In some implementations, the storage device may maintain persistent data after converting from a first firmware executed a first mode to a second firmware executed a second mode. The storage device may include a memory device to store metadata used on the storage device. A controller on the storage device may receive a firmware package associated with the second mode while the storage device is operating in the first mode. The controller may activate the firmware package while operating in the first mode. The controller may execute a translation descriptor in the firmware package to translate a first data structure used in the first mode to a second data structure used in the second mode and the controller may ensure that the second data structure persists after a power cycle when the storage device is formatted to execute the second firmware associated with the second mode.

In some implementations, a method is provided on a storage device for maintaining persistent data after converting from a first firmware executed a first mode to a second firmware executed a second mode. The method includes receiving a firmware package associated with the second mode while the storage device is operating in the first mode. The method also includes activating the firmware package while operating in the first mode and executing a translation descriptor in the firmware package to translate a first data structure used in the first mode to a second data structure used in the second mode. The method further includes ensuring that the second data structure persists after a power cycle when the storage device is formatted to execute the second firmware associated with the second mode.

In some implementations, a method is provided for maintaining persistent data after converting from a first firmware executed a first mode to a second firmware executed a second mode. The method includes receiving a firmware package associated with the second mode while the storage device is operating in the first mode. The method also includes activating the firmware package in the first mode and determining when the firmware package includes translation descriptors. The method further includes allocating space for a second data structure associated with a translation descriptor in a volatile memory device and executing a copy macro in the translation descriptor to translate a first data structure used in the first mode to the second data structure used in the second mode. The method also includes receiving a commit command from a host, determining when there is the second data structure in the volatile memory device, and copying the second data structure to a non-volatile memory device. After completing the commit command and power cycling the storage device, during a first format of the storage device in the second mode, the method includes reading the second data structure from the non-volatile memory device, transferring the second data structure to a persistence module, and executing the first format of the storage device to operate storage device in the second mode.

Figure 1:
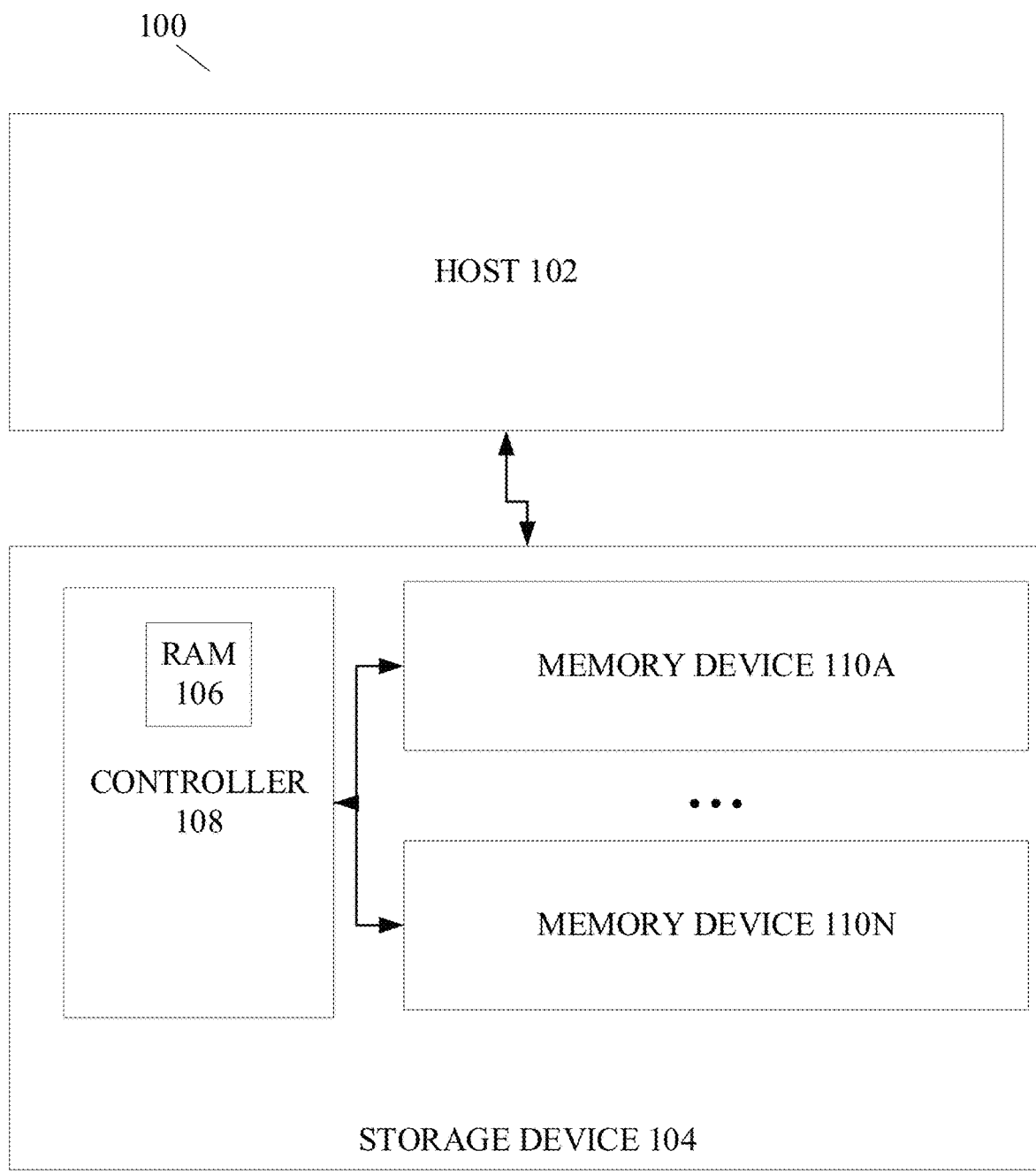
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 includes a host 102 and a storage device 104 that may be in the same physical location as components on a single computing device or on different computing devices that are communicatively coupled. Storage device 104, in various embodiments, may be disposed in one or more different locations relative to the host 102. System 100 may include additional components (not shown in this figure for the sake of simplicity).

Storage device 104 may include a random-access memory (RAM) 106, a controller 108, and one or more non-volatile memory devices 110a-110n (referred to herein as the memory device(s) 110). Storage device 104 may be, for example, a solid-state drive (SSD). RAM 106 may be static RAM (SRAM) or a dynamic RAM (DRAM) that may be used to store information used on storage device 104. Controller 108 may interface with host 102 and process foreground operations including instructions transmitted from host 102. For example, controller 108 may read data from and/or write to memory device 110 based on instructions received from host 102. Controller 108 may further execute background operations to manage resources on memory device 110. For example, controller 108 may monitor memory device 110 and may execute garbage collection and other relocation functions per internal relocation algorithms to refresh and/or relocate the data on memory device 110.

Memory device 110 may be flash based. For example, memory device 110 may be a NAND or NOR flash memory that may be used for storing host and control data over the operational life of memory device 110. Memory device 110 may include multiple dies for storing the data. Data may be stored in blocks on the dies in various formats, with the formats being defined by the number of bits that may be stored per memory cell. Memory device 110 may be included in storage device 104 or may be otherwise communicatively coupled to storage device 104.

Storage device 104 may be converted from functioning in a first mode to functioning in a second mode. For example, storage device 104 may be updated/changed from a conventional storage device (i.e., a storage device operating in a first mode) to a zone namespace (ZNS) storage device, an endurance group enabled device, or an FDP enabled device (i.e., a storage device operating in a second mode). While storage device 104 is operating in the first mode, storage device 104 may receive a firmware package including a firmware binary for the second mode and one or more translation descriptors. Each translation descriptor may identify how to translate metadata in a data structure being used in the first mode (referred to herein as a first data structure) to a data structure to be used in the second mode (referred to herein as a second data structure). As such the firmware package may identify the types and the number of data structures (first data structures) to be converted from the first mode to second data structures for use in the second mode. Storage device 104 may download and activate the firmware binary. Storage device 104 may then be power cycled to boot into the second mode.

When a firmware download command is received by storage device 104, storage device 104 may check the integrity of the firmware package. For example, storage device 104 may check the security and signing of the firmware package. If storage device 104 determines that the firmware package has not been tampered with, storage device 104 may determine when the firmware package includes translation descriptors, allocate space for the second data structure associated with each translation descriptor in the firmware package in RAM 106, and execute a copy macro in the translation descriptor. The copy macro in a translation descriptor may be used to identify first data structure(s) used in the first mode, identify new/second data structure(s) to be used in the second mode, and identify which fields to copy from the first data structure to the second data structure.

To ensure that the second data structure persists after a power cycle, when storage device 104 receives a commit command from host 102 to activate the firmware (referred to herein as the second firmware) associated with the second mode, storage device 104 may copy the firmware binary to memory device 110, for example, a NOR or NAND flash. Storage device 104 may determine when, based on the translation descriptor(s) in the firmware package, there is a second/composite data structure that needs to be committed to the NOR or NAND flash, and may write the new data structure to a temporary area in the NOR or NAND flash.

When storage device completes a firmware commit action, storage device 104 may be power cycled before booting into the second firmware in the second mode. When the second firmware is successfully booted and during a first format of storage device 104 in the second mode, storage device 104 may read the second/composite data structure from the temporary area of the NAND or NOR flash and transfer the second data structure over to a persistence module which may be, for example, a SCRAM a module that handles power cycle and is responsible for persisting storage device 104 metadata and data structures. Storage device 104 may then execute the format command so that storage device 104 may execute the second firmware and operate in the second mode.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
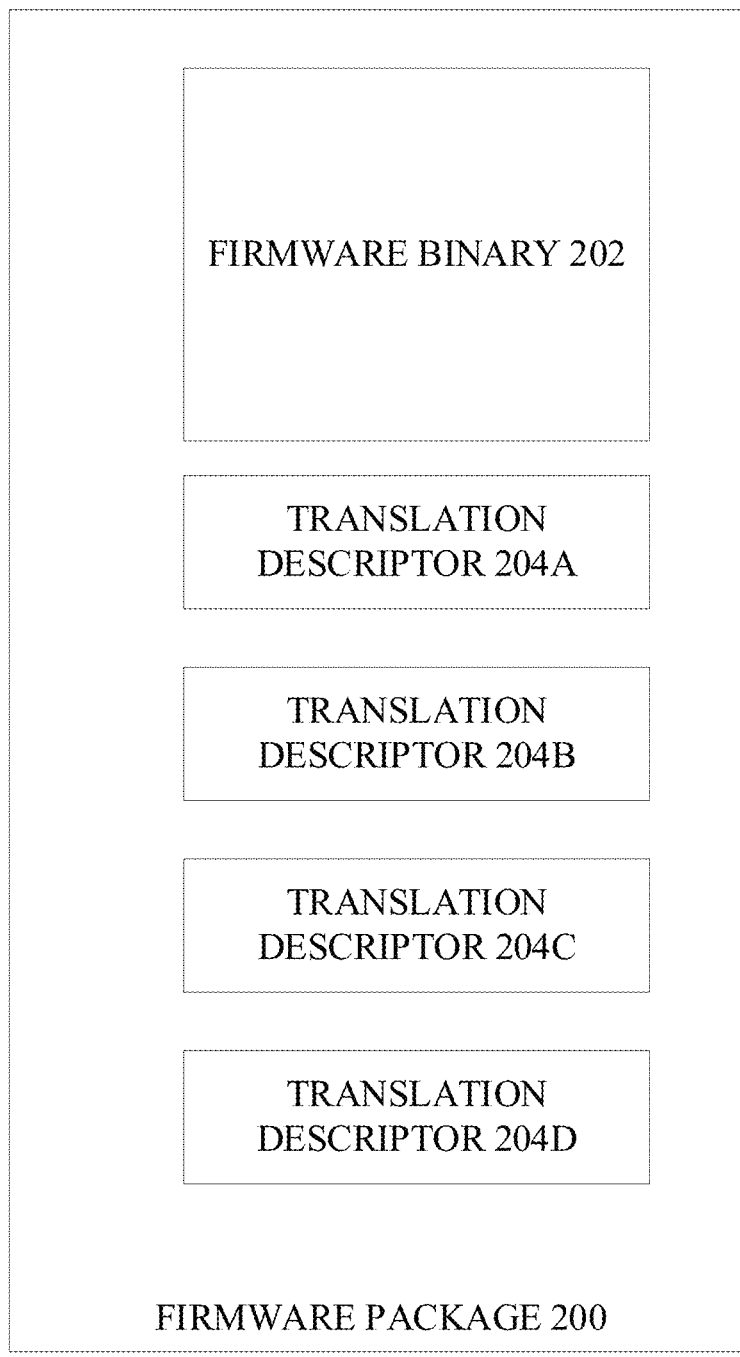
FIG. 2 is an example block diagram of a firmware package used in accordance with some implementations.

FIG. 2 is an example block diagram of a firmware package used in accordance with some implementations. Firmware package 200 may include a firmware binary 202 which may be an executable and linkable file. Firmware package 200 may also include one or more translation descriptors shown as 204A-204D (generally referred to herein as translation descriptors 204). Each translation descriptor 204 may identify the first data structure including metadata that needs to be copied from the first mode to the second mode. As indicated above FIG. 2 is provided as an example. Other examples may differ from what is described in FIG. 2.

Figure 3:
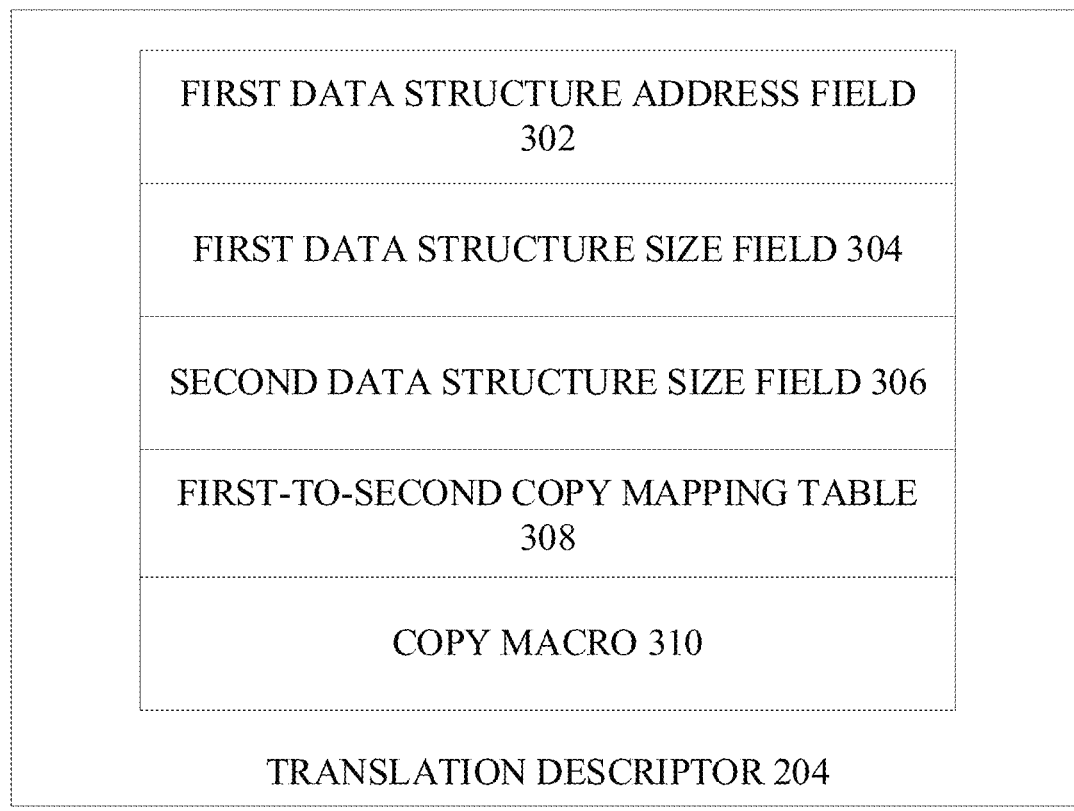
FIG. 3 is an example block diagram of a translation descriptor used in accordance with some implementations.

FIG. 3 is an example block diagram of a translation descriptor used in accordance with some implementations. Translation descriptor 204 includes a first data structure address field 302, a first data structure size field 304, a second data structure size field 306, a first-to-second copy mapping table 308, and a copy macro-310. First data structure address field 302 may contain an address of a first data structure being used by firmware (first firmware) running in the first mode on storage device 104, wherein the first data structure is to be translated to match the firmware requirements in the second mode. First data structure size field 304 may include the size of the first data structure that is to be translated to match the firmware requirements in the second mode. Second data structure size field 306 may include the size of a second data structure as per the firmware requirements in the second mode. Copy mapping table 308 may include a source offset field, a destination offset field, and the number of bytes to copy field for elements in the first data structure. Copy macro 310 may include code to translate metadata from the first structure to the second structure. As indicated above FIG. 3 is provided as an example. Other examples may differ from what is described in FIG. 3.

Figure 4:
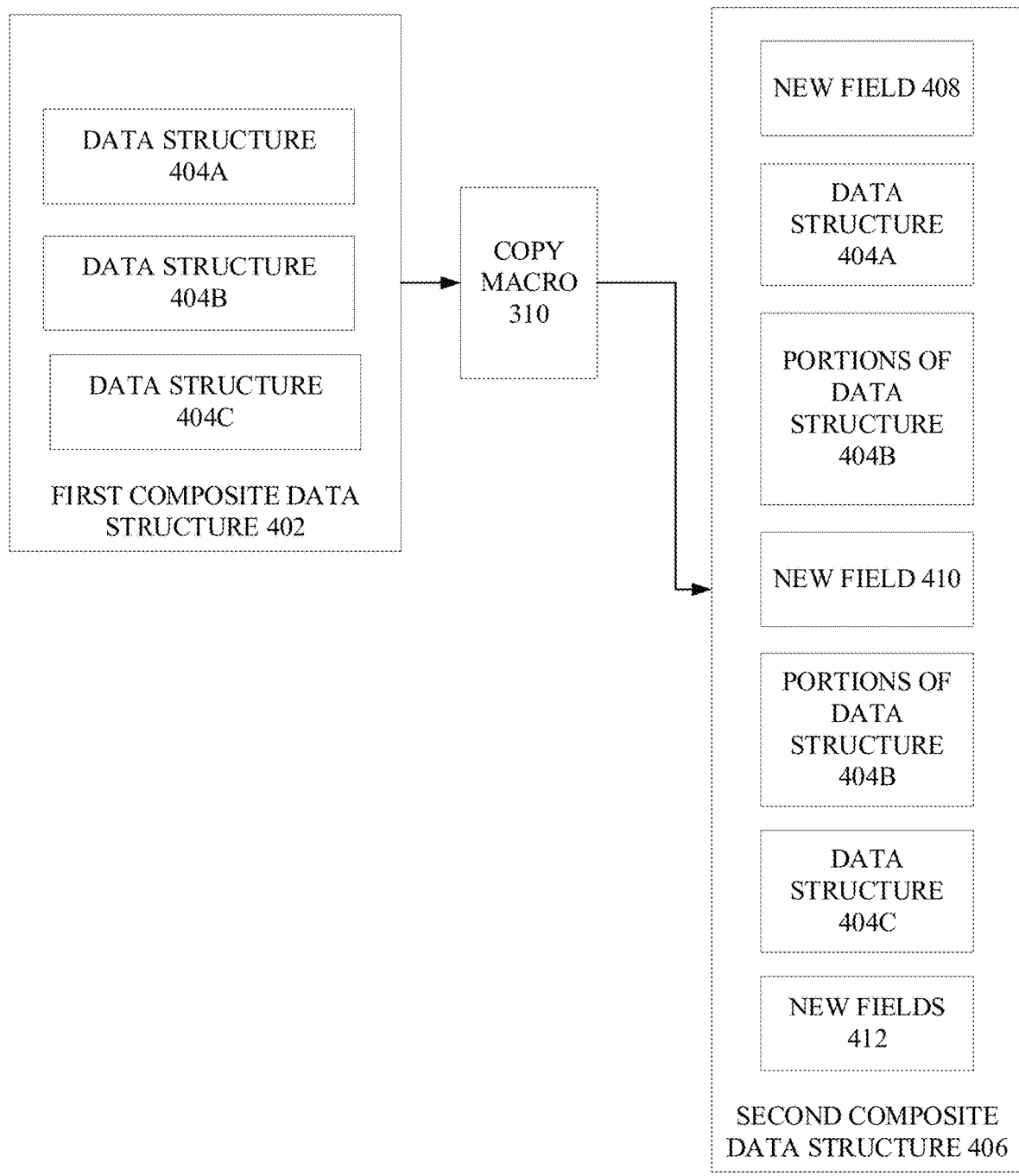
FIG. 4 is an example block diagram showing how a second/composite data structure is copied from a first mode to a second mode using a translation descriptor in accordance with some implementations.

FIG. 4 is an example block diagram showing how a second/composite data structure is copied from a first mode to a second mode using a translation descriptor in accordance with some implementations. A first composite data structure 402 may include multiple first data structures 404A-404C as used in the first mode. First composite data structure 402 may be stored in RAM 106. In the second mode, the size and contents of the first data structures 404A and 404C may remain the same. However, the size of the first data structure 404B may be increased in the second mode because new information may be added to data structure 404B. Copy macro 310 in a translation descriptor 204 associated with first composite data structure 402 may create a second composite data structure 406 to be used in the second mode. The second composite data structure 406 may include data from data structures 404A-404C and new fields. For example, based on the information in an associated translation descriptor 204, copy macro 310 may add new field 408 to second composite data structure 406 and copy first data structure 404A to the second composite data structure 406. Copy macro 310 may also copy fields from portions (for example, the first half) of first data structure 404B, add a new field 410, and copy fields from portions (for example, the second half) of first data structure 404B to second composite data structure 406. Copy macro 310 may then copy first data structure 404C to second composite data structure 406 and add new fields 412 to second composite data structure 406. As such, using translation descriptor 204, copy macro 310 may reduce/increase the size of a second data structure created for use in the second mode, retain information copied from a first data structure used in the first mode to a second data structure to be used in a second mode, and add/remove information to and from a second data structure created in the second mode. Translation descriptor 204 therefore provides flexibility and enables release of the second firmware to be used in the second mode such that the second firmware may include unknown data structures that were not used by the first firmware in the first mode. As indicated above FIG. 4 is provided as an example. Other examples may differ from what is described in FIG. 4.

Figure 5:
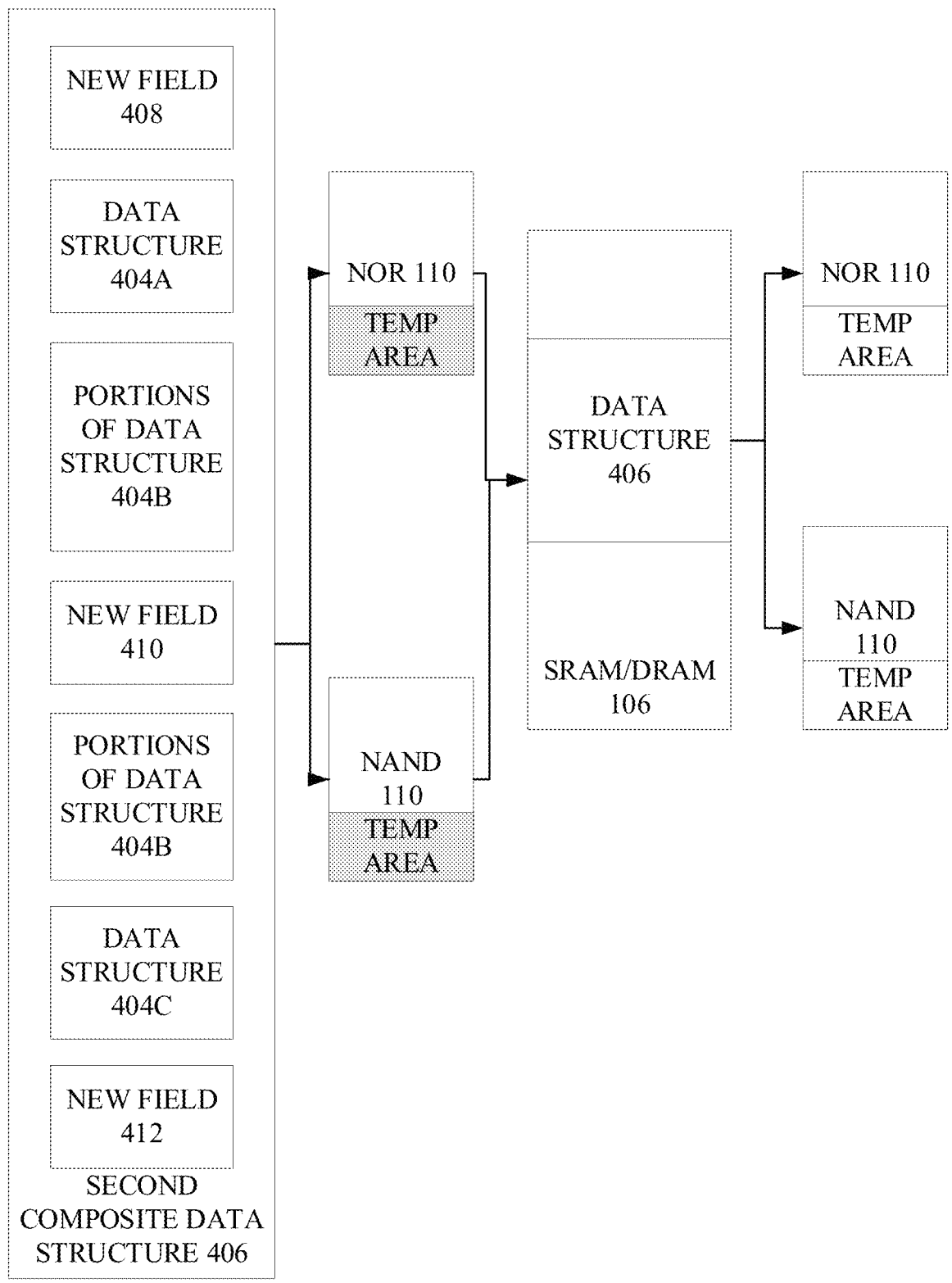
FIG. 5 is an example block diagram showing how the second composite data structure is made to persist from a first mode to a second mode in accordance with some implementations.

FIG. 5 is an example block diagram showing how a second composite data structure is made to persist from a first mode to a second mode in accordance with some implementations. When storage device 104 receives a firmware commit command from host 102 and completes the firmware commit action, storage device 104 may determine that composite data structure 406 exists and write composite data structure 406 to a temporary area in memory device 110 including, for example, a NAND or NOR flash. A shaded temporary area is provided to show that composite data structure 406 has been copied into the NAND or NOR flash. Storage device 104 may be power cycled before booting into the second firmware in the second mode. Once the second firmware in the second mode is successfully booted and during the first format operation on storage device 104 in the second mode, storage device 104 may read composite data structure 406 from the temporary area of a NAND or NOR flash and transfer composite data structure 406 over to RAM 106 so that the persistence module which is responsible for persisting the storage device metadata during run time can handle composite data structure 406. Storage device 104 may delete composite data structure 406 from NAND or NOR flash. As indicated above FIG. 5 is provided as an example. Other examples may differ from what is described in FIG. 5.

Figure 6:
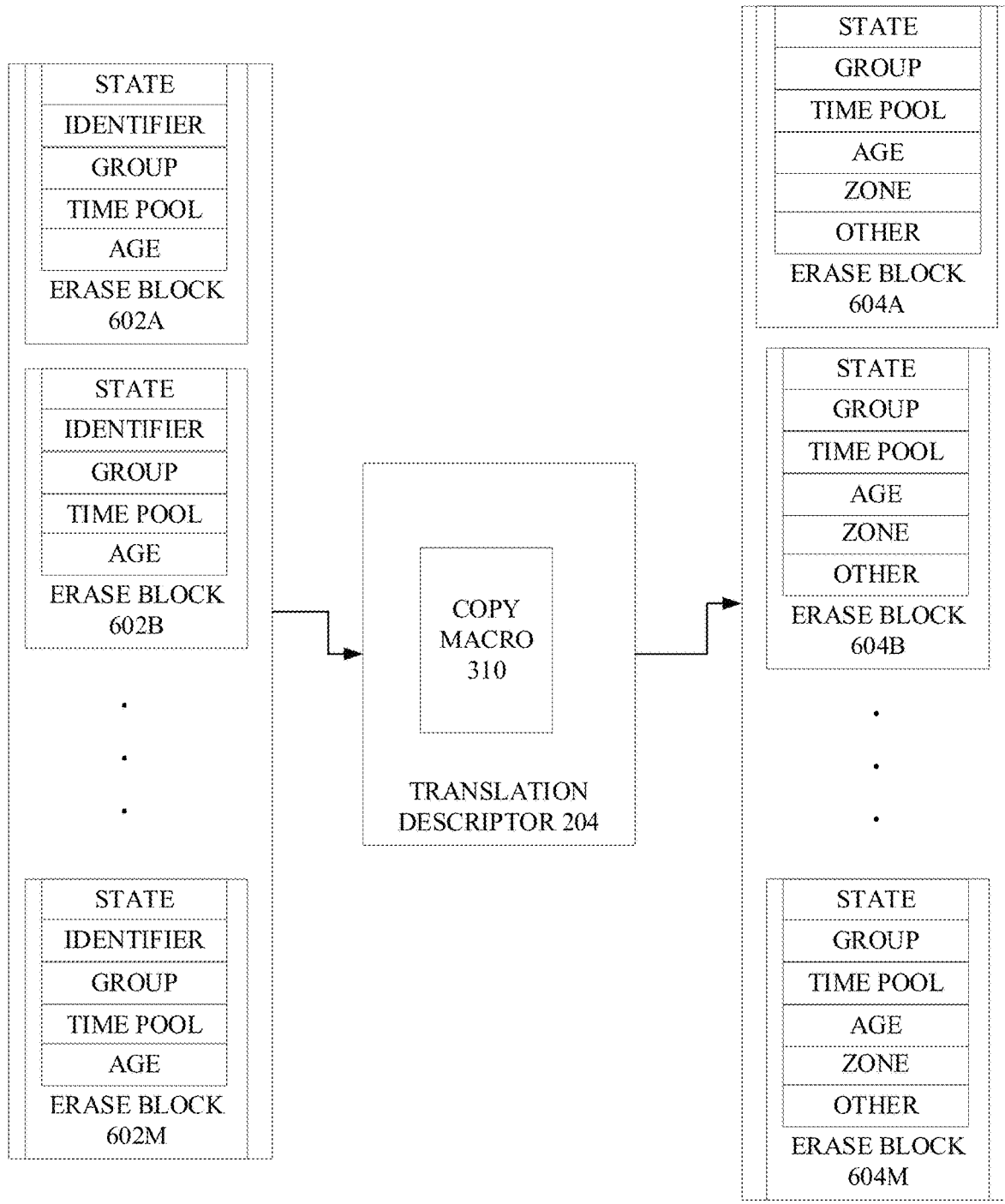
FIG. 6 is an example block diagram showing an example use case that ensures persistent erase block metadata when firmware being executed on a storage device operating in a first mode is converted to firmware to be executed in a second mode in accordance with some implementations.

FIG. 6 is an example block diagram showing an example use case that ensures persistent erase block metadata when firmware being executed on a storage device operating in a first mode is converted to firmware to be executed in a second mode in accordance with some implementations. The first mode may include erase blocks data structures 602A-602M (i.e., first erase blocks data structures), each of which may include a state field, an identifier, a group field, a time pool group field, and an age field. A copy macro 310 in a translation descriptor 204 included in a firmware package may translate erase blocks data structures 602A-602M to erase blocks data structures 604A-604M. Each erase blocks data structures 604A-604M may include a state field, a group field, a time pool group field, an age field, a zone group field, and other fields. As such, erase blocks data structures 604A-604M may not include the identifier field that was in erase blocks data structures 602A-602M and erase blocks data structures 604A-604M may include other fields that were not in erase blocks data structures 602A-602M. As indicated above FIG. 6 is provided as an example. Other examples may differ from what is described in FIG. 6.

Figure 7:
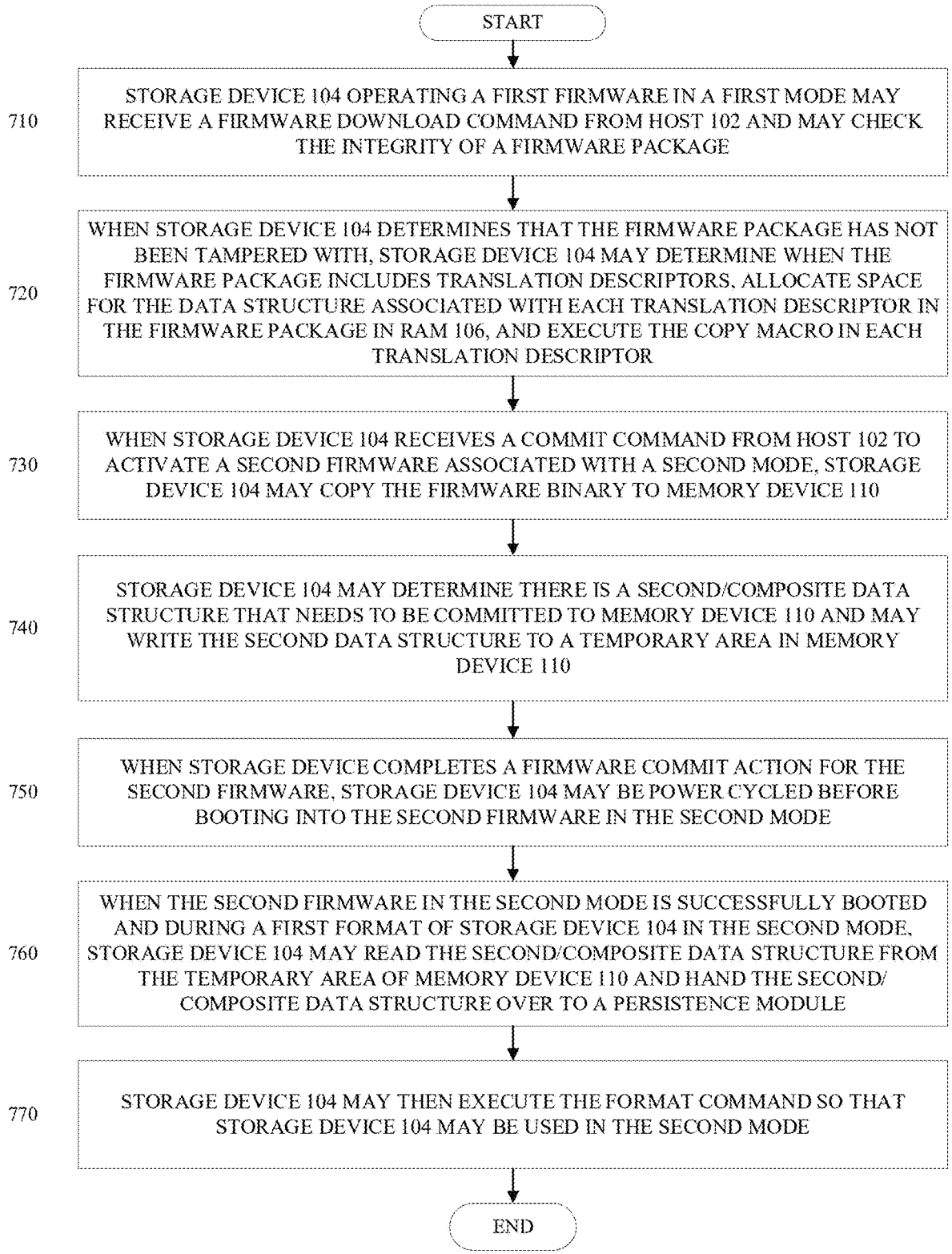
FIG. 7 is an example flow diagram for maintaining persistent metadata when converting firmware being executed on a storage device operating in a first mode to firmware to be executed in a second mode in accordance with some implementations.

FIG. 7 is an example flow diagram for maintaining persistent metadata when converting firmware being executed on a storage device operating in a first mode to firmware to be executed in a second mode in accordance with some implementations. At 710, storage device 104 operating a first firmware in a first mode may receive a firmware download command from host 102 and may check the integrity of a firmware package. At 720, when storage device 104 determines that the firmware package has not been tampered with, storage device 104 may determine when the firmware package includes translation descriptors, allocate space for the data structure associated with each translation descriptor in the firmware package in RAM 106, and execute the copy macro in each translation descriptor. At 730, when storage device 104 receives a commit command from host 102 to activate a second firmware associated with a second mode, storage device 104 may copy the firmware binary to memory device 110. At 740, storage device 104 may determine there is a second/composite data structure that needs to be committed to memory device 110 and may write the second data structure to a temporary area in memory device 110. At 750, when storage device completes a firmware commit action for the second firmware, storage device 104 may be power cycled before booting into the second firmware in the second mode. At 760, when the second firmware in the second mode is successfully booted and during a first format of storage device 104 in the second mode, storage device 104 may read the second/composite data structure from the temporary area of memory device 110 and hand the second/composite data structure over to a persistence module. At 770, storage device 104 may then execute the format command so that storage device 104 may be used in the second mode. As indicated above FIG. 7 is provided as an example. Other examples may differ from what is described in FIG. 7.

Figure 8:
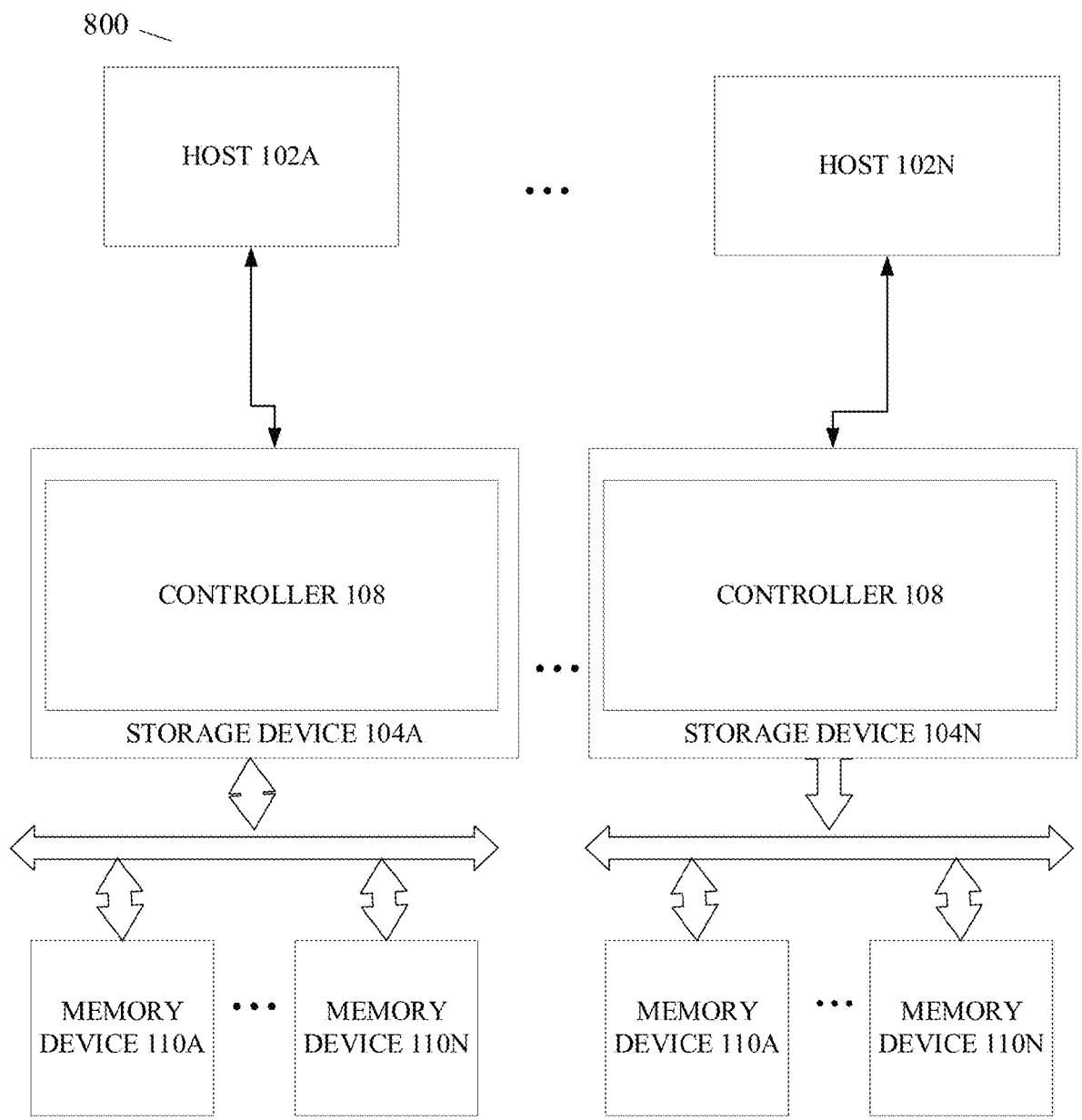
FIG. 8 is a diagram of an example environment in which systems and/or methods described herein are implemented.

FIG. 8 is a diagram of an example environment in which systems and/or methods described herein are implemented. As shown in FIG. 8, Environment 800 may include hosts 102-102n (referred to herein as host(s) 102), and one or more storage devices 104a-104n (referred to herein as storage device(s) 104). Storage device 104 may include a controller 108 to carry out persistent data structure translation when converting storage device 104 from operating in a first mode to a second mode. Hosts 102 and storage devices 104 may communicate via Non-Volatile Memory Express (NVMe) over peripheral component interconnect express (PCI Express or PCIe), SD, or the like.

Devices of Environment 800 may interconnect via wired connections, wireless connections, or a combination of wired and wireless connections. For example, the network in FIG. 8 may include NVMe over Fabric (NVMe-oF) Internet Small Computer Systems Interface (iSCSI), Fibre Channel (FC), Fibre Channel Over Ethernet (FCoE) connectivity and any another type of next-generation network and storage protocols, a local area network (LAN), a wide area network (WAN), a metropolitan area network (MAN), a private network, an ad hoc network, an intranet, the Internet, a fiber optic-based network, a cloud computing network, or the like, and/or a combination of these or other types of networks.

The number and arrangement of devices and networks shown in FIG. 8 are provided as an example. In practice, there may be additional devices and/or networks, fewer devices and/or networks, different devices and/or networks, or differently arranged devices and/or networks than those shown in FIG. 8. Furthermore, two or more devices shown in FIG. 8 may be implemented within a single device, or a single device shown in FIG. 8 may be implemented as multiple, distributed devices. Additionally, or alternatively, a set of devices (e.g., one or more devices) of Environment 800 may perform one or more functions described as being performed by another set of devices of Environment 800.

Figure 9:
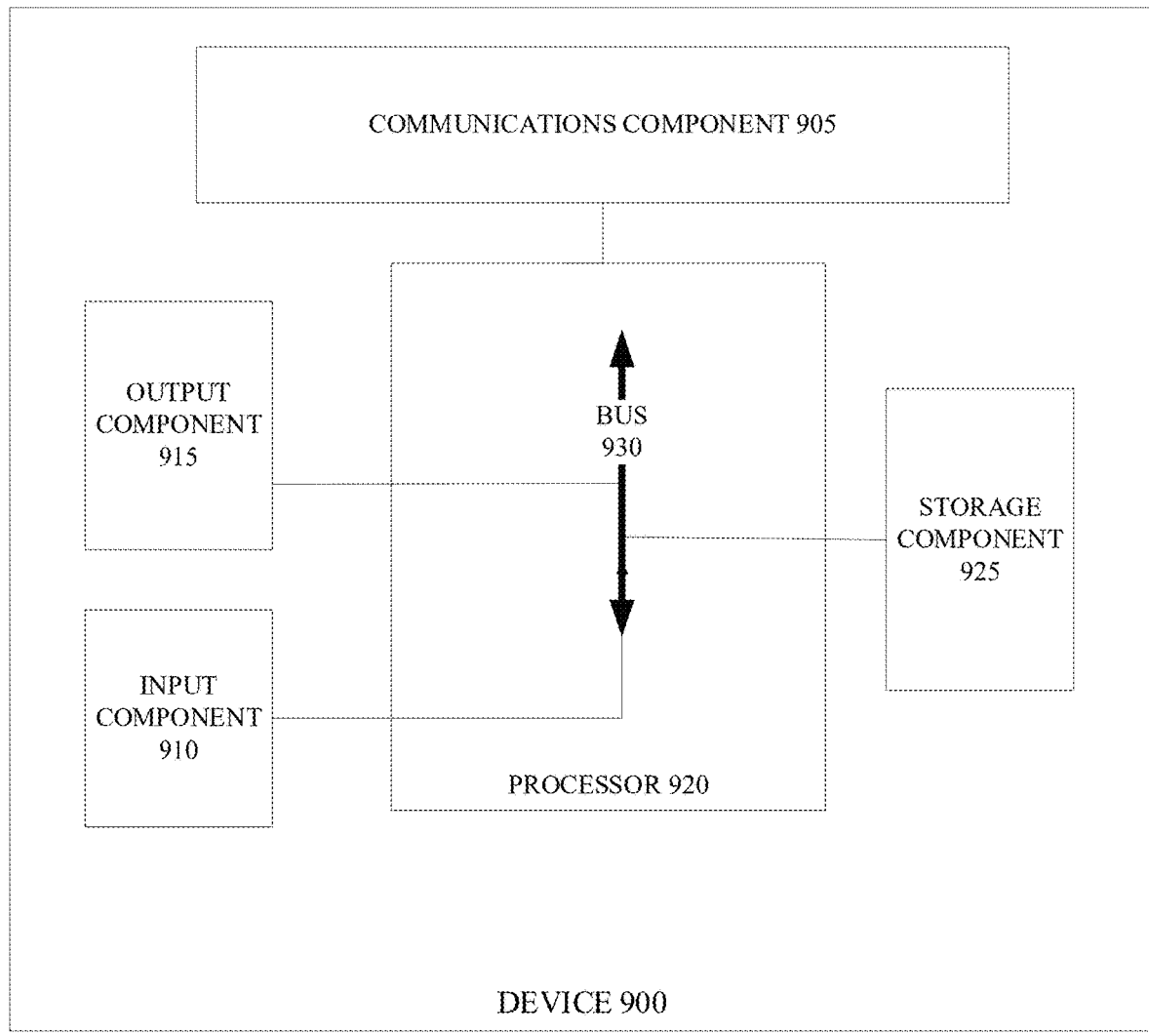
FIG. 9 is a diagram of example components of one or more devices of FIG. 1.

FIG. 9 is a diagram of example components of one or more devices of FIG. 1. In some implementations, host 102 may include one or more devices 900 and/or one or more components of device 900. Device 900 may include, for example, a communications component 905, an input component 910, an output component 915, a processor 920, a storage component 925, and a bus 930. Bus 930 may include components that enable communication among multiple components of device 900, wherein components of device 900 may be coupled to be in communication with other components of device 900 via bus 930.

Input component 910 may include components that permit device 900 to receive information via user input (e.g., keypad, a keyboard, a mouse, a pointing device, and a network/data connection port, or the like), and/or components that permit device 900 to determine the location or other sensor information (e.g., an accelerometer, a gyroscope, an actuator, another type of positional or environmental sensor). Output component 915 may include components that provide output information from device 900 (e.g., a speaker, display screen, and network/data connection port, or the like). Input component 910 and output component 915 may also be coupled to be in communication with processor 920.

Processor 920 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 920 may include one or more processors capable of being programmed to perform a function. Processor 920 may be implemented in hardware, firmware, and/or a combination of hardware and software.

Storage component 925 may include one or more memory devices, such as random-access memory (RAM 106), read-only memory (ROM), and/or another type of dynamic or static storage device (e.g., a flash memory, a magnetic memory, and/or optical memory) that stores information and/or instructions for use by processor 920. A memory device may include memory space within a single physical storage device or memory space spread across multiple physical storage devices. Storage component 925 may also store information and/or software related to the operation and use of device 900. For example, storage component 925 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, CXL device and/or another type of non-transitory computer-readable medium, along with a corresponding drive.

Communications component 905 may include a transceiver-like component that enables device 900 to communicate with other devices, such as via a wired connection, a wireless connection, or a combination of wired and wireless connections. The communications component 905 may permit device 900 to receive information from another device and/or provide information to another device. For example, communications component 905 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 905 may also include one or more broadband and/or narrowband transceivers and/or other similar types of wireless transceiver configurable to communicate via a wireless network for infrastructure communications. Communications component 905 may also include one or more local area network or personal area network transceivers, such as a Wi-Fi transceiver or a Bluetooth transceiver.

Device 900 may perform one or more processes described herein. For example, device 900 may perform these processes based on processor 920 executing software instructions stored by a non-transitory computer-readable medium, such as storage component 925. As used herein, the term "computer-readable medium" refers to a non-transitory memory device. Software instructions may be read into storage component 925 from another computer-readable medium or from another device via communications component 905. When executed, software instructions stored in storage component 925 may cause processor 920 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 9 are provided as an example. In practice, device 900 may include additional components, fewer components, different components, or differently arranged components than those shown in FIG. 9. Additionally, or alternatively, a set of components (e.g., one or more components) of device 900 may perform one or more functions described as being performed by another set of components of device 900.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to maintain persistent data after converting firmware on the storage device from a first firmware executed a first mode to a second firmware executed a second mode, the storage device comprises:

a memory device to store metadata used on the storage device; and a controller to receive a firmware package associated with a second mode while the storage device is operating in a first mode, activate the firmware package while executing a first firmware in the first mode, execute a translation descriptor in the firmware package to translate a first data structure used in the first mode to a second data structure used in the second mode, and ensure that the second data structure persists after a power cycle when the storage device is formatted to execute a second firmware associated with the second mode.

2. The storage device of claim 1, wherein the firmware package includes a firmware binary associated with the second mode and at least one translation descriptor, wherein the translation descriptor identifies the first data structure including metadata to be copied from the first mode to the second mode and defines the second data structure.

3. The storage device of claim 1, wherein the translation descriptor includes a first data structure address field, a first data structure size field, a second data structure size field, a mapping table, and a copy macro, wherein the copy macro translates metadata from the first data structure to the second data structure.

4. The storage device of claim 3, wherein the mapping table includes a source offset field, a destination offset field, and a number of bytes to copy field for elements in the first data structure.

5. The storage device of claim 1, wherein the second firmware converts the storage device to one of a zone namespace enabled device, an endurance group enabled device, and a flexible data placement (FDP) enabled device.

6. The storage device of claim 1, wherein the firmware package identifies types of data structures and a number of first data structures in the first mode to be converted to second data structures in the second mode.

7. The storage device of claim 1, wherein prior to activating the firmware package, the controller checks the integrity of the firmware package, determines a number of translation descriptors included in the firmware package, allocates space for the second data structure in the translation descriptor in a volatile memory on the storage device, and executes a copy macro in the translation descriptor to copy metadata in the first data structure to the second data structure.

8. The storage device of claim 7, wherein the copy macro identifies the first data structure, the second data structure, and which fields to copy from the first data structure to the second data structure.

9. The storage device of claim 1, wherein in activating the firmware package, when the storage device receives a commit command from a host, the controller copies the second firmware associated with the second mode to the memory device, determines when the second data structure is in a volatile memory, and copies the second data structure to the memory device.

10. The storage device of claim 1, wherein in activating the firmware package, the storage device is power cycled before booting into the second firmware associated with the second mode and during a first format of the storage device in the second mode, the controller reads the second data structure from the memory device, transfers the second data structure over to a persistence module and executes the first format of the storage device in the second mode.

11. A method for maintaining persistent data after converting firmware on a storage device from a first firmware executed a first mode to a second firmware executed a second mode, wherein the storage device comprises a controller to execute the method comprising:

receiving a firmware package associated with a second mode while the storage device is operating in a first mode;

activating the firmware package while executing a first firmware in the first mode;

executing a translation descriptor in the firmware package to translate a first data structure used in the first mode to a second data structure used in the second mode; and ensuring that the second data structure persists after a power cycle when the storage device is formatted to operate with a second firmware associated with the second mode.

12. The method of claim 11, wherein the activating comprises checking the integrity of the firmware package, determining that the firmware package has not been tampered with, and determining if the firmware package includes translation descriptors.

13. The method of claim 11, wherein executing comprises allocating space for the second data structure associated with the translation descriptor in a volatile memory device and executing a copy macro in the translation descriptor.

14. The method of claim 13, further comprising using the copy macro to identify the first data structure, the second data structure, and which fields to copy from the first data structure to the second data structure.

15. The method of claim 11, wherein executing the translation descriptor comprises using the translation descriptor to modify the second data structure size and contents.

16. The method of claim 11, wherein ensuring further comprises receiving a commit command from a host, copying the second firmware associated with the second mode to a non-volatile memory device, determining that the second data structure is in a volatile memory device, and copying the second data structure to the non-volatile memory device.

17. The method of claim 11, wherein after power cycling the storage device, before booting into the second firmware and during a first format of the storage device in the second mode, the method comprises reading the second data structure from a non-volatile memory device, transferring the second data structure over to a persistence module, and executing the first format of the storage device in the second mode.

18. A method for maintaining persistent data after converting firmware on a storage device from a first firmware executed a first mode to a second firmware executed a second mode, wherein the storage device comprises a controller to execute the method comprising:

receiving a firmware package associated with a second mode while the storage device is executing a first firmware in a first mode;

activating the firmware package in the first mode and determining when the firmware package includes a translation descriptor;

allocating space for a second data structure associated with the translation descriptor in a volatile memory device and executing a copy macro in the translation descriptor to translate a first data structure used in the first mode to the second data structure used in the second mode;

receiving a commit command from a host, determining when there is the second data structure in the volatile memory device, and copying the second data structure to a non-volatile memory device;

completing the commit command and power cycling the storage device; and during a first format of the storage device in the second mode, reading the second data structure from the non-volatile memory device, transferring the second data structure to a persistence module, and executing the first format of the storage device to operate storage device in the second mode.

19. The method of claim 18, further comprising using the copy macro to identify the first data structure, the second data structure, and which fields to copy from the first data structure to the second data structure.

20. The method of claim 18, wherein executing the translation descriptor comprises using the translation descriptor to modify the second data structure size and contents.

* * * * *